United States Patent [19]

Sellers

[11] Patent Number: 5,594,618
[45] Date of Patent: Jan. 14, 1997

[54] COLLAPSIBLE POINTING STICK APPARATUS FOR A PORTABLE COMPUTER

[75] Inventor: Charles A. Sellers, Houston, Tex.

[73] Assignee: Compaq Computer Corporation, Houston, Tex.

[21] Appl. No.: 384,153

[22] Filed: Feb. 6, 1995

[51] Int. Cl.$^6$ ............... G06F 1/16; H01H 21/06
[52] U.S. Cl. ............... 361/680; 345/168; 200/6 A
[58] Field of Search .................... 345/161, 168, 345/169; 364/708.1; 400/472, 479, 488–492, 682, 691–693; 200/5 A, 6 A; 361/680, 683

[56] References Cited

U.S. PATENT DOCUMENTS 5,521,596  5/1996  Selker et al. ............... 345/161 X

FOREIGN PATENT DOCUMENTS 4-284526  10/1992  Japan .

OTHER PUBLICATIONS

Toshiba T4400C brochure.
IBM Technical Disclosure Bulletin, vol. 31, No. 11, pp. 288 and 289, Apr. 1989, "Telescopic Joystick", copy in 400–479.

*Primary Examiner*—Michael W. Phillips
*Attorney, Agent, or Firm*—Konneker & Smith

[57] ABSTRACT

A collapsible pointing stick structure is mounted on the top side of the keyboard of a notebook computer and is manually pivotable, about a selected axis parallel to the top side of the keyboard, to controllably reposition a cursor being displayed on the lid portion of the computer. When the computer lid is opened, the top end of the pointing stick structure projects upwardly beyond the top sides of the keyboard key cap members to facilitate its manual engagement and manipulation by the user of the computer. However, in response to closing of the computer lid, the top end of the pointing stick structure is automatically collapsed to an elevation generally aligned with the top sides of the key cap members. Due to the collapsible operation of the pointing stick structure its incorporation into the computer does not require that the vertical thickness of the closed computer be increased. A mechanism prevents the pointing stick structure from collapsing when the lid portion is open.

19 Claims, 2 Drawing Sheets

COLLAPSIBLE POINTING STICK APPARATUS FOR A PORTABLE COMPUTER

BACKGROUND OF THE INVENTION

1. Field of the Invention

The present invention generally relates to computer apparatus and, in a preferred embodiment thereof, more particularly relates to pointing apparatus used to position a cursor on the display screen of a portable computer.

2. Description of Related Art

In portable computers, such as the increasingly popular notebook computer, a variety of cursor control or "pointing" devices have been utilized to position the cursor on the display screen portion of the computer. These devices include built-in and clip-on trackball structures, separate mouse devices, and devices known as "pointing sticks".

Unlike its trackball and mouse counterparts, which provide a ball-shaped element that must be rolled to effect the desired cursor movement on the display screen, a pointing stick is typically positioned between a pair of key caps on the computer keyboard and projects upwardly beyond their top side surfaces. To controllably move the cursor about the display screen the pointing stick is pushed generally parallel to the top side of the keyboard, about an appropriate horizontal axis. For example, if it is desired to move the cursor rightwardly on the screen, the pointing stick is rocked to the right and then released when the cursor reaches the desired new location on the screen. To effect the desired cursor movement built-in sensors in the overall pointing stick structure detect the direction in which the stick has been manually rocked, and the force with which it has been rocked, and responsively output a signal to the cursor control circuitry of the computer to move the cursor in the desired direction, and at the desired speed, respectively.

Conventionally constructed pointing sticks potentially offer several advantages over trackballs and mice. For example, the typical pointing stick is positioned on the keyboard in a manner such that it may be manipulated by the computer user without removing his hands from their "home key" touch typing position. Additionally, since the pointing stick is built into the computer there is no separate pointing device that must be connected to the computer during its use, and then disconnected when the computer is to be stored. Moreover, the pointing stick is quite compact in a horizontal direction, thereby permitting it to be readily incorporated in the keyboard of a modern notebook computer.

As conventionally constructed, however, pointing sticks of this general type tend to conflict with the design goal of minimizing the thickness of the modern notebook computer. Specifically, since the lid portion of a notebook computer typically closes onto the top sides of the keyboard key caps, and the top end of the pointing stick projects upwardly beyond the top sides of the key caps to enable the computer user to reach and manipulate the stick, it has heretofore been necessary to construct the lid in a manner such that it clears the pointing stick when closed. This, in turn, undesirably increases the overall thickness of the notebook computer in its closed storage and transport orientation.

As can readily be seen from the foregoing, it would be desirable to provide on a portable computer keyboard an improved pointing stick structure which maintains the accessibility and ease of use of a conventional pointing stick yet does not appreciably increase the overall thickness of its associated portable computer due to increased lid clearance requirements. It is accordingly an object of the present invention to provide a portable computer, such as a notebook computer, with improved pointing stick structure having these characteristics.

SUMMARY OF THE INVENTION

In carrying out principles of the present invention, in accordance with a preferred embodiment thereof, a portable computer, representatively a notebook computer, is provided which includes a base housing having a top side, and a lid housing secured to the base housing for pivotal movement relative thereto between a closed position in which the lid housing extends across and covers the top side of the base housing, and an open position in which the lid housing uncovers and exposes the top side of the base housing. The lid housing has a screen portion upon which a movable cursor may be displayed. A keyboard is carried on the top side of the base housing and has a series of manually depressible key cap members thereon.

Cursor positioning means are provided for selectively moving a cursor displayed on the screen portion of the lid housing. In accordance with principles of the present invention, the cursor positioning means include a specially designed, collapsible pointing stick structure that includes a stem structure having a length transverse to the keyboard, and upper and lower ends.

Support means are carried on the keyboard and are operative to support the stem structure for longitudinal movement relative thereto between an upwardly extended operating position and a downwardly retracted storage and transport position, and permit the stem structure in its operating position to be manually pivoted about an axis transverse to the length of the stem structure.

Preferably, when the stem structure is in its upwardly extended operating position its upper end is somewhat higher than the top sides of the key cap members to facilitate its manual engagement and manipulation, and when the stem structure is in its downwardly retracted storage and transport position its upper end is generally level with the top sides of the key cap members.

Detection means are provided for sensing a manual pivoting of the stem structure about an axis transverse thereto and responsively generating an electrical output signal usable to reposition a cursor displayed on the screen portion of the lid housing, and spring means are provided for resiliently biasing the stem structure toward its operating position.

Stem structure positioning means are provided for locking the stem structure in its operating position when the lid housing is opened, and for automatically collapsing the stem structure to its storage and transport position in response to closing of the lid housing. In this manner, the upper end of the stem structure is desirably positioned above the top sides of the key cap members when the lid housing is opened, but is automatically lowered when the lid housing is closed so that the presence of the pointing stick structure does not undesirably increase the vertical thickness of the closed computer.

To effect this collapsible characteristic of the pointing stick structure, the stem structure positioning means are operative to (1) permit the lid housing to downwardly engage the stem structure, forcibly move it from its operating position to its storage and transport position, and hold it in its storage and transport position, in response to movement of the lid housing from its open position to its closed position, and (2) permit the stem structure to be returned to its operating position by the spring means, and then releasably preclude the stem structure from being moved from its operating position to its storage and transport position, in response to movement of the lid housing from its closed position to its open position.

Representatively, the stem structure positioning means include (a) a positioning member supported in the base housing for movement relative thereto between a first position in which the positioning member underlies the stem structure and blocks the movement thereof from its operating position to its storage and transport position, and a second position in which the position member permits the stem structure to be moved from its operating position to its storage and transport position, and (b) driving means for (1) moving the positioning member from its second position to its first position in response to movement of the lid housing from its closed position to its open position, and (2) moving the positioning member from its first position to its second position in response to movement of the lid housing from its open position to its closed position.

DETAILED DESCRIPTION

Figure 1:
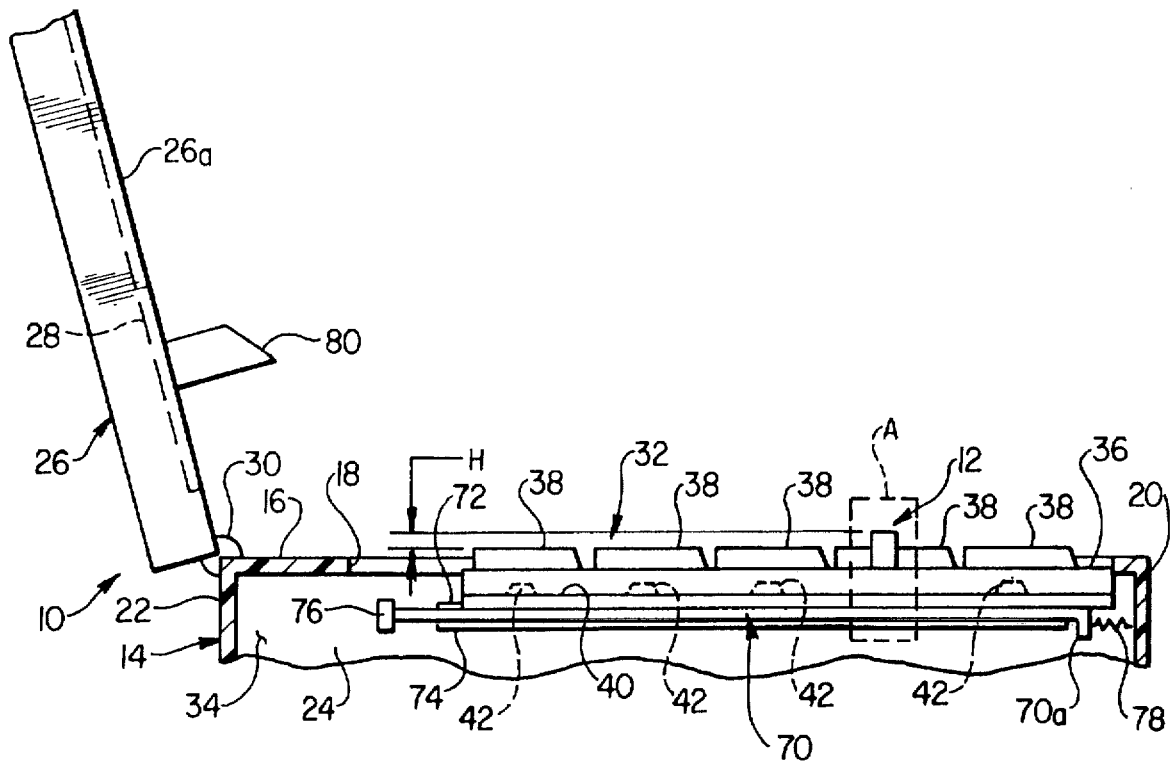
FIG. 1 is a partially sectioned, simplified side elevational view of a portion of a representative notebook computer having incorporated therein a specially designed collapsible pointing stick structure embodying principles of the present invention, the computer being in an opened position with the pointing stick in its upwardly extended use orientation.
Figure 2:
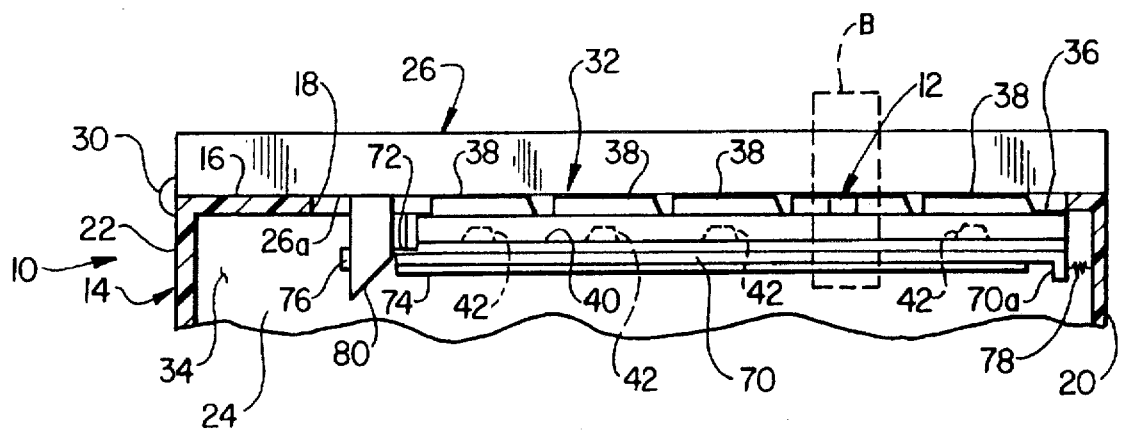
FIG. 2 is a view similar to that in FIG. 1, but with the computer in its closed orientation and the pointing stick in its downwardly retracted storage/transport orientation.

Referring initially to FIGS. 1 and 2, the present invention provides a portable computer, illustratively a notebook computer 10, having incorporated therein a specially designed collapsible pointing stick structure 12 embodying principles of the present invention. Computer 10 includes a hollow rectangular base housing 14 having a top horizontal side wall 16 with a rectangular opening 18 therein; front and rear vertical side walls 20,22; and a pair of vertical end walls 24.

A hollow rectangular lid housing 26, having a display screen 28 on its front or inner side 26a, is pivotally secured along a hinge joint 30 to a top rear corner portion of the base housing 14. Lid housing 26 may be upwardly pivoted to place the computer 10 in an open use orientation (FIG. 1) in which the top side 16 of the base housing 14 is exposed and the display screen 28 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 26 in its FIG. 2 closed orientation.

A generally conventional keyboard 32 extends across the opening 18 in the top side wall 16 of the base housing 14 and occupies a relatively small upper portion of the interior 34 of the base housing. The keyboard 32 basically comprises a relatively thin rectangular monoblock support structure 36 that horizontally extends across the base housing top side opening 18 and is suitably anchored to the base housing 14; a series of manually depressible key cap members 38 operatively carried by the monoblock structure 36; and a horizontally oriented, rectangularly configured multilayer signal pad structure 40 that underlies and is suitably anchored to the monoblock support structure 36.

The signal pad structure 40 is of a generally conventional construction and has surface trace circuitry therein that senses the manual depression of each key cap 38 and responsively outputs an appropriate electrical signal indicative of the striking of that particular key cap. Each of a spaced series of resilient key return domes 42 secured to the top side of the multilayer signal pad structure underlies one of the key caps 38. When one of key caps 38 is depressed it vertically compresses its associated return dome 42. Upon release of the key cap it is upwardly returned to its normal position by the return dome.

The pointing stick structure 12 forms a portion of an overall positioning system used to selectively reposition a cursor (not shown) on the display screen 28 in response to manual manipulation of the pointing stick structure as subsequently described herein. As illustrated in FIGS. 1–4, the collapsible pointing stick structure 12 is disposed between an adjacent pair of key caps 38 and is suitably secured to the top side of the multilayer signal pad structure 40. When the lid housing 26 is opened, pointing stick structure 12 is in an operating position thereof in which its top end projects upwardly a small distance H above the top sides of the key caps 38 (see FIGS. 1 and 3), as in the case of a conventional pointing stick, to facilitate the manual engagement and manipulation of the pointing stick structure 12 by a user of the keyboard 32 for the purpose of selectively repositioning a cursor on the display screen 28.

However, in accordance with a primary aspect of the present invention, and as subsequently described herein, when the lid housing 26 is closed its inner or front side 26a engages the top end of the pointing stick structure 12 and vertically collapses the pointing stick structure to a storage and transport position, shown in FIGS. 2 and 4, in which the top end of the pointing stick structure 12 is generally level with the top sides of the key caps 38. Accordingly, and quite advantageously, the vertical thickness of the computer 10 in its closed position does not have to be thickened to accommodate the presence of the pointing stick structure 12. Also in a manner subsequently described herein, when the lid housing 26 is later opened the pointing stick structure 12 is automatically returned to its upwardly extended operating position shown in FIGS. 1 and 3.

Figure 3:
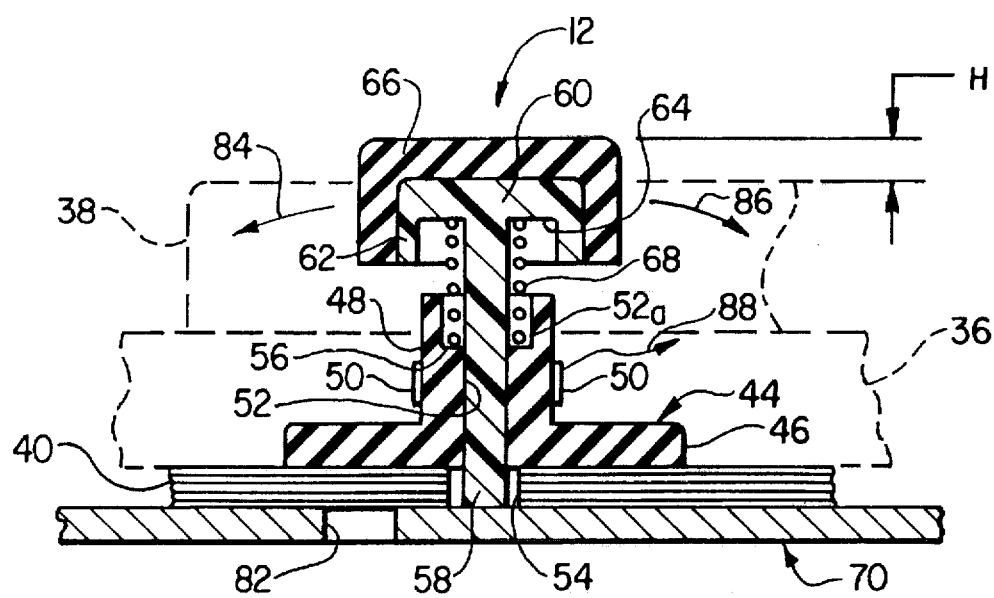
FIG. 3 is an enlarged scale, partially phantomed cross-sectional detail view of the dashed line area "A" in FIG. 1.

Referring now to FIG. 3, in which the lid housing 26 is opened and the pointing stick structure 12 is in its upwardly extended operating position, the pointing stick structure 12 includes a support member in the form of a stick sensor housing 44 formed from a suitable resiliently deflectable material, such as rubber, and having a disc-shaped base 46 anchored to the top side of the signal pad structure 40. Projecting upwardly from a central portion of the base 46 is a cylindrical boss portion 48 having a circumferentially spaced series of strain gages 50, representatively four in number, adhered to its outer side surface.

A cylindrical bore 52, having an enlarged upper end portion 52a, extends vertically through the sensor housing 44, between the upper end of the boss 48 and the underside of the base 46, and overlies a small circular opening 54 formed in the multilayer signal pad structure 40. The enlarged upper end portion 52a of the bore 52 forms an annular, upwardly facing interior ledge 56 within the boss 48.

The pointing stick structure 12 also includes a stem structure that defines a force input portion of the structure 12 and includes an elongated cylindrical actuating stem 58 closely and slidingly received in the bore 52 and having a laterally enlarged, generally disc-shaped upper end portion 60 with a downturned annular flange 62 disposed around its periphery. Flange 62 forms within the enlarged upper end portion 60 of the stem 58 an annular, downwardly facing ledge 64. A rubber cap member 66 is fitted over and secured to the enlarged upper stem portion 60, as illustrated in FIGS. 3 and 4, to complete the stem structure. A cylindrical coil compression spring member 68 circumscribes the stem 58. The spring 68 bears at its opposite ends against the annular ledges 56,64 and serves to resiliently bias the stem 58 toward its upwardly extended operating position shown in FIG. 3.

Referring again to FIGS. 1 and 2, a horizontally oriented shifting plate member 70 is slidingly supported within the base housing 14, directly beneath the signal pad structure 40, by pairs of rail members 72,74 on the interior surfaces of the base housing end walls 24 for horizontal forward and rearward movement relative to the base housing 14. A front side edge portion 70a of the plate member 70 is downwardly bent, and rearward movement of the plate member 70 is limited by a pair of stop projections 76 formed on the interior surfaces of the base housing end walls 24 and rearwardly positioned in the path of the rear side edge of the plate member 70.

Schematically depicted compression spring means 78 are connected between the interior surface of the base housing front side wall 20 and the downturned plate end portion 70a and function to resiliently bias the plate member 70 rearwardly into engagement with the stop projections 76. With the lid housing 26 opened the spring means 78 hold the rear side edge of the plate member 70 against these stop projections 76 as illustrated in FIG. 1.

However, as the lid housing 26 is subsequently closed, a spaced pair of tapered cam projections 80 disposed on the inner or front side 26a of the lid housing 26 engage the rear side edge of the plate member 70 and forwardly drive the plate member 70 to its FIG. 2 position against the resilient resistance force of the spring means 78. When the lid housing 26 is opened again, the cam projections 80 are lifted out of engagement with the rear side edge of the plate member 70 to thereby permit the spring means 78 to rearwardly drive the plate member 70 back to its FIG. 1 position.

Figure 4:
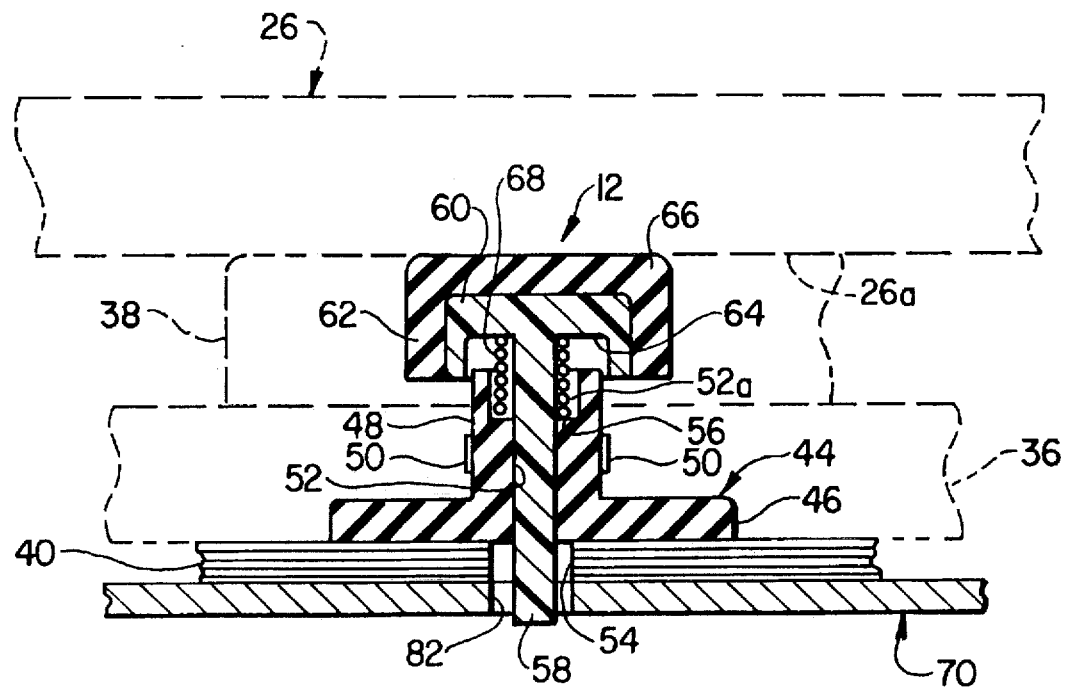
FIG. 4 is an enlarged scale, partially phantomed cross-sectional detail view of the dashed line area "B" in FIG. 2.

Referring now to FIGS. 3 and 4, the plate member 70 has an opening 82 formed therein. When the lid housing 26 is opened and the plate member 70 is in its rearwardly shifted position shown in FIGS. 1 and 3, the plate opening 82 is rearwardly offset from the signal pad structure opening 54. However, when the lid housing 26 is closed and the plate member 70 is in its forwardly shifted position shown in FIGS. 2 and 4, the plate opening 82 is disposed directly beneath the signal pad structure opening 54.

As best illustrated in FIG. 3, when the lid housing 26 is opened and the plate member 70 is in its rearwardly shifted FIG. 1 position, the bottom end of the pointing stick structure stem 58 bears against the top side surface of the plate member 70, and the spring member 68 resiliently holds the stem 58 in its upwardly extended operating position in which the top side of the cap member 66 projects upwardly by the distance H above the top sides of the key caps 38. The pointing stick structure 12 may then be operated in the same general manner as a conventionally constructed pointing stick.

Specifically, when it is desired to reposition the cursor on the display screen the computer user manually engages the upwardly projecting cap 66 and pushes it in an appropriate horizontal direction to cause the stem 58 to rock about a horizontal axis adjacent its bottom end. For example, if the user wants to upwardly reposition the cursor on the display screen he simply pushes the cap rearwardly toward the display screen, thereby causing the stem 58 to rock forwardly as indicated by the arrow 84 in FIG. 3. If a downward repositioning of the cursor is desired, the cap 66 is pushed forwardly to cause the stem 58 to rock forwardly as indicated by the arrow 86 in FIG. 3.

The rocking of the stem 58 causes a corresponding lateral deflection of the sensor housing boss portion 48 which, in turn, places a detectable stress on one or more of the strain gages 50 which serve as detection means for sensing a manual pivoting of the stem 58 about an axis transverse thereto. In response to this stress the strain gages 50, in a conventional manner, output an electrical signal 88 which is utilized by the cursor positioning circuitry portion of the computer (not shown) to effect the desired relocation of the cursor on the display screen. As will be readily appreciated by those skilled in this particular art, the illustrated strain gages 50 could be replaced by other force sensing means located, for example, beneath the base portion 46 of the sensor housing 44.

In response to closing the lid housing 26 the pointing stick structure 12 is automatically moved from its FIG. 3 upwardly extended operating position to its FIG. 4 downwardly retracted storage and transport position in the following manner. During an initial portion of the movement of the lid housing from its open position toward its closed position the plate member 70 is moved from its FIG. 3 position to its FIG. 4 position in which the plate opening 82 is moved directly under the signal pad structure opening 54.

While the lid housing is traversing this initial portion of its closing movement the spring 68 continues to hold the stem 58 in its upwardly extended position even after the plate opening 82 is moved directly beneath the signal pad structure opening 54. During the remaining portion of the movement of the lid housing 26 to its fully closed position the front side 26a of the lid housing downwardly engages the cap 66 and forces the stem 58 downwardly to its FIG. 4 retracted position, against the resilient biasing force of the spring 58.

As the stem is downwardly retracted in this manner, to bring the top side of the cap 66 downwardly into alignment with the top sides of the key caps 38, a lower end portion of the stem 58 passes downwardly through the plate opening 82. When the lid housing 26 is subsequently opened, the initial opening movement of the lid housing disengages its front side surface 26a from the top side of the cap 66, thereby permitting the spring 68 to upwardly return the stem 58 to its FIG. 3 operating position in which the bottom end of the stem 58 clears the top side of the plate member 70. Subsequent opening movement of the lid housing 26 rearwardly shifts the plate member 70 to its FIG. 3 position in which it underlies and acts as an operating support base for the bottom end of the stem 58.

While the shifting means that allow the downward retraction of the stem 58 have been representatively illustrated as including the plate member 70 disposed beneath the signal pad structure 40, it will be appreciated by those of skill in this particular art that a shifting member of a different configuration could be used if desired. Additionally, the shifting means could alternately be a portion of the signal pad structure that is supported for horizontal movement relative to the balance of the signal pad structure if desired.

The foregoing detailed description is to be clearly understood as being given by way of illustration and example only, the spirit and scope of the present invention being limited solely by the appended claims.

What is claimed is:

1. The portable computer comprising:

a base housing having a top side;

a lid housing secured to said base housing for pivotal movement relative thereto between a closed position in which said lid housing extends across and covers said top side of said base housing, and an open position in which said lid housing uncovers and exposes said top side of said base housing, said lid housing having a screen portion upon which a movable cursor may be displayed;

a keyboard carried on said top side of said base housing and having a series of manually depressible key cap members thereon; and cursor positioning means operative to selectively move a cursor displayed on said screen portion, said cursor positioning means including a pointing stick structure comprising:

a stem structure having a length transverse to said keyboard, and upper and lower ends, support means, carried on said keyboard, for supporting said stem structure for longitudinal movement relative to said support means between an upwardly extended operating position and a downwardly retracted storage and transport position, and for permitting said stem structure in said operating position thereof to be manually pivoted about an axis transverse to the length thereof, detection means for sensing a manual pivoting of said stem structure about an axis transverse thereto and responsively generating an electrical output signal usable to reposition a cursor displayed on said screen portion, spring means for resiliently biasing said stem structure toward said operating position thereof, and stem structure positioning means operative to (1) permit said lid housing to downwardly engage said stem structure, forcibly move it from said operating position to said storage and transport position, and hold it in said storage and transport position, in response to movement of said lid housing from said open position to said closed position and then (2) permit said stem structure to be returned to said operating position thereof by said spring means, and then releasably preclude said stem structure from being moved from said operating position to said storage and transport position, in response to movement of said lid housing from said closed position to said open position.

2. The portable computer of claim 1 wherein:

said key cap members have top sides, said upper end of said stem structure projects above said top sides of said key cap members when said stem structure is in said operating position thereof, and said upper end of said stem structure is generally aligned with said top sides of said key cap members when said stem structure is in said storage and transport position thereof.

3. The portable computer of claim 1 wherein said support means include:

a support member carried on said keyboard and slidingly receiving a longitudinal portion of said stem structure.

4. The portable computer of claim 3 wherein:

a portion of said support member is resiliently deflectable by said stem structure in response to a manual pivoting of said stem structure about an axis transverse thereto, and said detection means are operative to sense the resilient deflection of said portion of said support member.

5. The portable computer of claim 4 wherein said detection means include:

a plurality of strain gages operatively carried on said portion of said support member.

6. The portable computer of claim 3 wherein:

said stem structure and said support member have vertically facing portions, and said spring means include a compression spring member extending between and engaging said vertically facing portions of said stem structure and said support member.

7. The portable computer of claim 1 wherein said stem structure positioning means include:

a positioning member supported in said base housing for movement relative thereto between a first position in which said positioning member underlies said stem structure and blocks the movement thereof from said operating position to said storage and transport position, and a second position in which said positioning member permits said stem structure to be moved from said operating position to said storage and transport position, and driving means for (1) moving said positioning member from said second position to said first position in response to movement of said lid housing from said closed position to said open position, and (2) moving said positioning member from said first position to said second position in response to movement of said lid housing from said open position to said closed position.

8. The portable computer of claim 7 wherein:

said positioning member is a plate member slidably carried within said base housing beneath said stem structure for transverse sliding movement relative thereto between said first and second positions, and said driving means include:

spring means for resiliently biasing said plate member from said second position toward said first position, and cam means, carried by said lid housing, for engaging said plate member and driving it from said first position to said second position as said lid housing is being closed.

9. The portable computer of claim 8 wherein:

said plate member has an opening therein that underlies said lower end of said stem structure and permits said lower end of said stem structure to pass downwardly therethrough when said plate member is in said second position.

10. The portable computer of claim 1 wherein said portable computer is a notebook computer.

11. A portable computer comprising:

a base housing having a top side;

a lid housing secured to said base housing for pivotal movement relative thereto between a closed position in which said lid housing extends across and covers said top side of said base housing, and an open position in which said lid housing uncovers and exposes said top side of said base housing, said lid housing having a screen portion upon which a movable cursor may be displayed;

a keyboard carried on said top side of said base housing, said keyboard having a top side upon which a series of manually depressible key cap members are operatively supported, said key cap members having top sides; and collapsible pointing stick means carried on said top side of said keyboard and being operative to output an electrical signal usable to selectively reposition a cursor displayed on said screen portion, said collapsible pointing stick means including:

a force input portion supported on and projecting upwardly from said top side of said keyboard, said force input portion being (1) manually pivotable about an axis generally parallel to said top side of said keyboard to generate said electrical signal, and (2) movable in a direction transverse to said top side of said keyboard between an upwardly extended operating position and a downwardly retracted storage and transport position, first means for moving said force input portion (1) from said storage and transport position to said operating position in response to opening said lid housing, and (2) from said operating position to said storage and transport position in response to closing said lid housing; and second means for precluding movement of said force input portion from said operating position to said storage and transport position when said lid housing is open.

12. The portable computer of claim 11 wherein said portable computer is a notebook computer.

13. The portable computer of claim 11 wherein:

said force input portion has a top end which projects upwardly beyond said top sides of said key cap members when said force input portion is in said operating position, and which is generally level with said top sides of said key cap members when said force input portion is in said storage and transport position.

14. The portable computer of claim 11 wherein said collapsible pointing stick means further include:

a support member carried on said top side of said keyboard and slidingly supporting said force input portion for vertical movement between said operating position and said storage and transport orientation, and spring means for engaging said support member and said force input portion and resiliently biasing said force input portion toward said operating position.

15. A portable computer comprising:

a base housing having a top side;

a lid housing secured to said base housing for pivotal movement relative thereto between a closed position in which said lid housing extends across and covers said top side of said base housing, and an open position in which said lid housing uncovers and exposes said top side of said base housing, said lid housing having a screen portion upon which a movable cursor may be displayed;

a keyboard carried on said top side of said base housing and including a monoblock support structure having a top side upon which a series of manually depressible key cap members are operatively mounted, said key cap members having top sides;

a multilayer signal pad structure disposed beneath said key cap members in a generally parallel relationship with said monoblock support structure, said signal pad structure having an opening formed therein;

a resiliently deflectable support member secured to the top side of said signal pad structure over said opening therein;

a stem structure longitudinally extending generally perpendicularly to said monoblock support structure, having a lower end received in said signal pad structure opening, and an upper end, and being slidingly carried by said support member for longitudinal movement relative thereto between an operating position in which said upper end is disposed above said top sides of said key cap members, and a storage and transport position in said upper end is generally level with said top sides of said key cap members, said stem structure being manually pivotable about an axis generally transverse thereto to resiliently deflect a portion of said support member;

detection means, responsive to a deflection of said portion of said support member by said stem structure, for generating an electrical usable to reposition a cursor displayed on said screen portion;

spring means, interconnected between said support member and said stem structure, for resiliently biasing said stem structure toward said operating position thereof; and stem structure positioning means operative to (1) permit said lid housing to downwardly engage said stem structure, forcibly move it from said operating position to said storage and transport position, and hold it in said storage and transport position, in response to movement of said lid housing from said open position to said closed position and then (2) permit said stem structure to be returned to said operating position thereof by said spring means, and then releasably preclude said stem structure from being moved from said operating position to said storage and transport position, in response to movement of said lid housing from said closed position to said open position.

16. The portable computer of claim 15 wherein said portable computer is a notebook computer.

17. The portable computer of claim 15 wherein said stem structure positioning means include:

a positioning member disposed beneath said signal pad structure and supported in said base housing for movement relative thereto between a first position in which said positioning member underlies said stem structure and blocks the movement thereof from said operating position to said storage and transport position, and a second position in which said positioning member permits said stem structure to be moved from said operating position to said storage and transport position, and driving means for (1) moving said positioning member from said second position to said first position in response to movement of said lid housing from said closed position to said open position, and (2) moving said positioning member from said first position to said second position in response to movement of said lid housing from said open position to said closed position.

18. The portable computer of claim 17 wherein:

said positioning member is a plate member slidably carried within said base housing, and parallel to said signal pad structure, for transverse movement relative to said stem structure between said first and second positions, and said driving means include:

spring means for resiliently biasing said plate member from said second position toward said first position, and cam means, carried by said lid housing, for engaging said plate member and driving it from said first position to said second position as said lid housing is being closed.

19. The portable computer of claim 18 wherein:

said plate member has an opening therein that underlies said lower end of said stem structure and permits said lower end of said stem structure to pass downwardly therethrough when said plate member is in said second position.

* * * * *